(12) United States Patent
Baumgart et al.

(10) Patent No.: US 6,652,915 B1
(45) Date of Patent: Nov. 25, 2003

(54) COATING MATERIAL CONTAINING A MIXTURE OF SILICIC ACIDS AND UREA AND/OR UREA DERIVATIVES

(75) Inventors: Hubert Baumgart, Münster (DE); Uwe Conring, Dülmen (DE); Vince Cook, Münster (DE); Peter Mayenfels, Münster (DE); Guido Schulze-Finkenbrink, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/926,533

(22) PCT Filed: May 22, 2000

(86) PCT No.: PCT/EP00/04617

§ 371 (c)(1),
(2), (4) Date: Nov. 16, 2001

(87) PCT Pub. No.: WO00/71596

PCT Pub. Date: Nov. 30, 2000

(30) Foreign Application Priority Data

May 25, 1999 (DE) .......................... 199 24 172

(51) Int. Cl.$^7$ .............................. B05D 1/38; B05D 3/02
(52) U.S. Cl. ..................................... 427/379; 427/407.1
(58) Field of Search .............................. 427/407.1, 379

(56) References Cited

U.S. PATENT DOCUMENTS

| | | | |
|---|---|---|---|
| 3,547,848 A | 12/1970 | Marsh et al. ............... 106/218 |
| 4,169,930 A | 10/1979 | Blount ......................... 528/38 |
| 4,246,382 A | 1/1981 | Honda et al. ................. 526/79 |
| 4,311,622 A | 1/1982 | Buter ......................... 524/542 |
| 4,383,068 A | 5/1983 | Brandt ........................ 524/196 |
| 4,416,941 A | 11/1983 | Barsotti ....................... 428/328 |
| 4,444,954 A | 4/1984 | Mels et al. ................... 525/124 |
| 4,489,135 A | 12/1984 | Drexler et al. ............ 428/423.1 |
| 4,522,958 A | 6/1985 | Das et al. .................... 523/212 |
| 4,528,319 A | 7/1985 | Ottaviani et al. ............. 524/540 |
| 4,565,730 A | 1/1986 | Poth et al. ................... 428/204 |
| 4,677,028 A | 6/1987 | Heeringa et al. ........... 428/422.8 |
| 4,710,542 A | 12/1987 | Forgione et al. ............. 525/127 |
| 4,754,014 A | 6/1988 | Ryntz et al. .................. 528/28 |
| 4,851,294 A | 7/1989 | Buter et al. ................ 428/425.8 |
| 4,851,460 A | 7/1989 | Stranghöner et al. ........ 523/407 |
| 4,880,867 A | 11/1989 | Gobel et al. ................. 524/507 |
| 4,914,148 A | 4/1990 | Hille et al. .................. 524/507 |
| 4,939,213 A | 7/1990 | Jacobs, III et al. ....... 525/329.9 |
| 4,945,128 A | 7/1990 | Hille et al. .................. 524/591 |
| 4,965,317 A | 10/1990 | Kania et al. |
| 5,075,372 A | 12/1991 | Hille et al. .................. 524/839 |
| 5,084,541 A | 1/1992 | Jacobs, III et al. ........... 528/45 |
| 5,086,087 A | 2/1992 | Misev ......................... 522/84 |
| 5,102,746 A | 4/1992 | Shindou et al. .............. 428/623 |
| 5,104,929 A | 4/1992 | Bilkadi ....................... 524/847 |
| 5,212,216 A | 5/1993 | Hattori et al. ............... 523/415 |
| 5,236,995 A | 8/1993 | Salatin et al. ................ 524/591 |
| 5,334,420 A | 8/1994 | Hartung et al. ............ 427/407.1 |
| 5,342,882 A | 8/1994 | Göbel et al. ................. 524/832 |
| 5,368,944 A | 11/1994 | Hatung et al. ............ 428/423.1 |
| 5,370,910 A | 12/1994 | Hille et al. ................ 427/407.1 |
| 5,384,367 A | 1/1995 | Swarup et al. ............... 525/169 |
| 5,416,136 A | 5/1995 | Konzmann et al. .......... 523/414 |
| 5,418,264 A | 5/1995 | Obloh et al. ................. 523/414 |
| 5,438,083 A | 8/1995 | Takimoto et al. ............ 523/401 |
| 5,468,461 A | 11/1995 | Hosoda et al. ............... 523/435 |
| 5,474,811 A | 12/1995 | Rehfuss et al. ........... 427/407.1 |
| 5,512,322 A | 4/1996 | Hille et al. ................ 427/407.1 |
| 5,552,496 A | 9/1996 | Vog-Birnbrich et al. ..... 525/440 |
| 5,569,705 A | 10/1996 | Vog-Birnbrich et al. ..... 524/591 |
| 5,571,861 A | 11/1996 | Klein et al. .................. 524/591 |
| 5,576,386 A | 11/1996 | Kempter et al. ............... 526/88 |
| 5,601,880 A | 2/1997 | Schwarte et al. ......... 427/407.1 |
| 5,623,016 A | 4/1997 | Klein et al. .................. 524/591 |
| 5,654,391 A | 8/1997 | Göbel et al. .................. 528/71 |
| 5,658,617 A | 8/1997 | Göbel et al. ............... 427/372.2 |
| 5,690,569 A | 11/1997 | Ledvina et al. .............. 474/111 |
| 5,691,419 A | 11/1997 | Engelke et al. .............. 525/208 |
| 5,691,425 A | 11/1997 | Klein et al. .................. 525/455 |
| 5,760,128 A | 6/1998 | Baltus et al. ................. 524/591 |
| 5,977,256 A | 11/1999 | Huybrechts et al. ......... 525/131 |
| 6,001,424 A | 12/1999 | Lettmann et al. ......... 427/407.1 |
| 6,001,915 A | 12/1999 | Scharte et al. ............... 524/457 |
| 6,111,001 A | 8/2000 | Barancky et al. ............ 524/211 |
| 6,403,699 B1 * | 6/2002 | Rockrath et al. ............ 524/556 |

FOREIGN PATENT DOCUMENTS

| | | |
|---|---|---|
| CA | 2102169 | 5/1907 |
| CA | 2079498 | 8/2001 |
| CA | 2102170 | 8/2001 |
| DE | 18 05 693 | 2/1970 |
| DE | 1 805 693 | 2/1970 |
| DE | 23 59 923 | 12/1973 |
| DE | 2 359 923 | 6/1974 |
| DE | 27 51 761 A1 | 6/1978 |
| DE | 28 48 906 A | 5/1979 |
| DE | 37 06 095 A1 | 8/1987 |
| DE | 38 07 571 A1 | 9/1988 |
| DE | 38 07 57 1 A1 | 9/1988 |
| DE | 43 28 092 A1 | 8/1993 |
| DE | 4310413 * | 10/1994 |
| DE | 44 21 823 A1 | 1/1996 |
| DE | 4423260 * | 1/1996 |
| DE | 195 24 182 A | 1/1997 |
| DE | 197 09 476 A1 | 11/1997 |
| DE | 197 09 465 A1 | 9/1998 |
| EP | 0 008 127 A | 3/1981 |
| EP | 0 038 127 A1 | 3/1981 |

(List continued on next page.)

OTHER PUBLICATIONS

Translation of JP 60–120750, Jun. 1985.*
English Translation on front page of the International Publication WO94/22968 Oct. 1994.

(List continued on next page.)

Primary Examiner—Erma Cameron

(57) ABSTRACT

The invention relates to a coating material containing a binding agent and a cross-linking agent, in addition to a thixotropic agent, wherein said material is a mixture of silicic acids and urea and/or urea derivatives.

17 Claims, No Drawings

FOREIGN PATENT DOCUMENTS

| | | |
|---|---|---|
| EP | 0 089 497 A2 | 2/1983 |
| EP | 192 304 A | 2/1986 |
| EP | 0 228 003 A1 | 12/1986 |
| EP | 0 234 361 A1 | 2/1987 |
| EP | 0 234 362 A1 | 2/1987 |
| EP | 0 245 700 B | 4/1987 |
| EP | 0 245 700 A2 | 4/1987 |
| EP | 0 249 201 A3 | 6/1987 |
| EP | 0 256 540 A2 | 8/1987 |
| EP | 0 260 447 A2 | 8/1987 |
| EP | 0 261 863 | 9/1987 |
| EP | 0 276 501 A2 | 9/1987 |
| EP | 0 299 148 A2 | 4/1988 |
| EP | 0 297 576 A1 | 6/1988 |
| EP | 0 354 261 A1 | 8/1988 |
| EP | 0 397 806 B1 | 7/1989 |
| EP | 0 358 153 B1 | 9/1989 |
| EP | 0 394 747 A1 | 4/1990 |
| EP | 0 401 565 A1 | 5/1990 |
| EP | 0 424 705 A2 | 10/1990 |
| EP | 0 543 817 B1 | 2/1991 |
| EP | 0 521 928 B1 | 3/1991 |
| EP | 0 593 454 B1 | 3/1991 |
| EP | 0 574 417 B1 | 2/1992 |
| EP | 0 531 510 B1 | 3/1992 |
| EP | 0 522 419 B1 | 6/1992 |
| EP | 0 522 420 A2 | 6/1992 |
| EP | 0 523 610 A1 | 7/1992 |
| EP | 0 536 712 A2 | 10/1992 |
| EP | 0 554 783 A1 | 1/1993 |
| EP | 0 581 211 A1 | 7/1993 |
| EP | 0 584 818 B | 8/1993 |
| EP | 0 590 484 A1 | 9/1993 |
| EP | 0 596 460 A2 | 11/1993 |
| EP | 0 624 577 A2 | 5/1994 |
| EP | 0 624 577 A | 5/1994 |
| EP | 0 708 788 B1 | 6/1994 |
| EP | 0 634 431 A1 | 7/1994 |
| EP | 0 649 865 A1 | 10/1994 |
| EP | 0 730 613 B1 | 11/1994 |
| EP | 0 669 356 A1 | 2/1995 |
| EP | 0 678 536 A1 | 4/1995 |
| EP | 0 596 461 A2 | 11/1995 |
| JP | 60-120750 * | 6/1985 |
| WO | WO82/12387 | 7/1982 |
| WO | WO92/22615 | 12/1992 |
| WO | WO94/22968 | 10/1994 |
| WO | WO95/14721 | 6/1995 |
| WO | WO95/27742 | 10/1995 |
| WO | WO96/12747 | 5/1996 |
| WO | WO97/12945 | 4/1997 |
| WO | WO97/49745 | 12/1997 |
| WO | WO97/49747 | 12/1997 |

OTHER PUBLICATIONS

English Translation on front page of the International Publication WO92/22615 Dec. 1992.

English Translation on front page of the International Publication WO96/12747 May 1996.

DE4421823 English Abstract Jan. 1996.

DE3726959 English Abstract Feb. 1989.

Patent Abstract of Japan, vol. 013, No. 205 (C–595), May 15., 1989, &JP 01 024851, Mitsui Toatsu Chem Inc, entitled " Thixotropic polyurethane compositions".

English Language Abstract for DE 197 09 465 A1 Sep. 1998.

Patent Abstract of Japan, vol. 009, No. 271 (c–311), Oct. 29, 1985.

International Search Report PCT/US 02/04588 filed Apr. 2, 2002.

* cited by examiner

COATING MATERIAL CONTAINING A MIXTURE OF SILICIC ACIDS AND UREA AND/OR UREA DERIVATIVES

This application is a National Phase Application of Patent Application PCT/EP004617 filed on May 22, 2000.

The invention relates to a coating material comprising a binder and a crosslinking agent and also a thixotropic agent from the group consisting of silicas and also urea and/or urea derivatives, to a process for preparing such a coating material, to the use of such a coating material for producing clearcoat, and to a process for producing clearcoats in the course of the production of multicoat color and/or effect paint systems.

Coating materials featuring thixotropic agents are known. Literature references EP-A-192 304, DE-A-23 59 923, DE-A-18 05 693, WO 94/22968, and DE-C-27 51 761 describe coating materials comprising urea derivatives as thixotropic agents. Alternatively, the literature references WO 97/12945 and farbe+lack November/1992, pages 829 ff., for example, describe coating materials comprising modified, hydrophilic or hydrophobic silicas as thixotropic agents. In passing, this literature reference also mentions urea derivatives as an alternative. Literature reference U.S. Pat. No. 4,169,930 discloses reaction products of silica and amines, urea for example, for use in coating materials. Finally, literature reference DE-A-37 26 959 discloses coating materials comprising urea in dissolved form. Because the urea is dissolved, it cannot fulfill the function of a thixotropic agent.

The use of thixotropic agents in coating materials is intended, among other things, to allow the application of comparatively thick coats of paint without the incidence of disruptive running. Particularly in the case of nonaqueous paints comprising a thixotropic agent based on urea derivatives, paint surfaces are obtained which—at high solids contents at any rate—are unsatisfactory with respect to their visual appearance (especially leveling and gloss) but which also, moreover, lead to coatings which lack sufficient condensation resistance (blushing due to water inclusion). Thixotropic agents based on silicas give coating materials which are likewise unsatisfactory with regard to leveling.

A key feature of thixotropic agents is that the viscosity of a paint prepared using them depends on the flow history and/or that the thixotropic agents are pseudoplastic, i.e., that the viscosity of the paint decreases as the shear stress increases. Starting from a baseline viscosity, the viscosity decreases during shear stress and only after the end of the shear stress does it gradually return to the initial level. A thixotropic gel, for example, is liquefied by the input of mechanical energy (stirring or the like) and solidifies gradually again only when the energy input is at an end. Pseudoplastic or thixotropic properties are advantageous for paint processing. In particular, it is possible to check and reduce the tendency toward running when a paint is applied with a high wet film thickness. On the other hand, thixotropic agents must not adversely affect the visual and chemical properties of a finished coating produced using them. As a general rule, thixotropic agents are particulate and are dispersed in a coating material, whether aqueous or nonaqueous. The urea derivatives are acicular crystals, in some cases with a helical twist, with a particle size distribution of between 0.1 $\mu$m and 6 $\mu$m (95–99% of the particles, based on the volume) and with 80% of the crystals (based on the number) being smaller than 2 $\mu$m. In the case of the silicas, the degree of grinding in the finished coating material is typically less than 10 $\mu$m in accordance with DIN ISO 1524.

The primary particle size of pyrogenic silicas is usually situated within the range from 5 to 20 nm.

The invention is therefore based on the technical problem of specifying a coating material which exhibits a reduced tendency toward running while at the same time meeting all of the requirements. The intention in particular is durably to improve leveling and storage stability of coating materials in the form of one-component and two-component or multi-component systems and also the condensation resistance of the clearcoat systems produced using them.

To solve this technical problem the invention teaches that the coating material comprises a mixture of silicas and urea and/or urea derivatives as a thixotropic agent.

Surprisingly, the use of a combination of these two thixotropic agents known per se leads not only to a coating material which exhibits a reduced tendency toward running but also to clearcoats which are entirely satisfactory with regard to leveling and condensation resistance: on vertical substrate areas it is possible to produce dry film thicknesses of up to 50 $\mu$m or more without running. This applies both to one-component systems and to multicomponent systems.

In the context of the present invention, a one-component (1K) system is a thermosetting coating material in which the binder and the crosslinking agent are present alongside one another, i.e., in one component. A prerequisite for this is that the two constituents undergo crosslinking with one another only at relatively high temperatures and/or on exposure to actinic radiation.

The coating material may also be a two-component (2K) or multicomponent (3K, 4K) system.

In the context of the present invention, this is a coating material in which in particular the binder and the crosslinking agent are present separately from one another in at least two components, which are not combined with one another until shortly before application. This form is chosen when binder and crosslinking agent react with one another even at room temperature. Coating materials of this kind are employed in particular for coating heat-sensitive substrates, especially in automotive refinish.

It is preferred that the urea derivative is obtainable by reaction of an isocyanato-containing compound, preferably a diisocyanate, with a primary or secondary amine or a mixture of such amines and/or water, preferably with an aliphatic, primary monoamine. Urea or the urea derivative is used in an amount of from 0.1 to 5.0% by weight, preferably from 0.2 to 2.5% by weight, most preferably from 0.6 to 1.8% by weight, based on the overall solids content of the coating material.

The thixotropic agents containing urea groups that are used in the nonaqueous coating materials are preferably prepared by reacting monoamines or mixtures of monoamines with polyisocyanates or mixtures of polyisocyanates, the monoamines and the polyisocyanates being reacted with one another in amounts such that the ratio of equivalents between amino groups and isocyanate groups lies between 1.2 and 0.4, preferably between 1.0 and 0.8.

Monoamines used are preferably primary monoamines, with particular preference araliphatic or aliphatic primary monoamines, with very particular preference aliphatic primary monoamines having at least 6 carbon atoms in the molecule. Examples of monoamines that could be used include the following: benzylamine, ethylamine, n-propylamine, isopropylamine, n-butylamine, isobutylamine, tert-butylamine, pentylamine, n-hexylamine, n-octylamine, isononanylamine, isotridecylamine, n-decylamine and stearylamine. It is also possible to use primary and secondary amines containing ether groups.

These are substances of the general formula (CH$_3$—(CH$_2$)$_a$—O—(CH$_2$)$_b$)$_c$NH$_d$, where a is an integer from 0 to 10, b is an integer from 1 to 20, c is 1 or 2, and the sum of c and d is always 3. Preferably, a=0, b=3, c=1, and d=2.

As polyisocyanates for the urea derivatives it is possible in principle to use any organic compound containing at least two isocyanate groups per molecule. It is also possible to use isocyanato-containing reaction products of, for example, polyols and polyamines and polyisocyanates. It is preferred to use diisocyanates, with very particular preference aliphatic diisocyanates, especially hexamethylene diisocyanate. Examples of polyisocyanates that can be used include the following: tetramethylene 1,4-diisocyanate, hexamethylene 1,6-diisocyanate, omega, omega'-dipropyl ether diisocyanate, cyclohexyl 1,4-diisocyanate, dicyclohexylmethane 4,4'-diisocyanate, 1,5-dimethyl-2,4-di(isocyanatomethyl)benzene, 1,5-dimethyl-2,4-di(isocyanatoethyl)benzene, 1,3,5-trimethyl-2,4-di(isocyanatomethyl)benzene, 1,3,5-triethyl-2,4-di(isocyanatomethyl)benzene, the trimer of hexamethylene 1,6-diisocyanate, isophorone diisocyanate, dicyclohexyldimethylmethane 4,4'-diisocyanate, 2,4-tolylene diisocyanate, 2,6-tolylene diisocyanate, diphenylmethane 4,4'-diisocyanate. Further examples of suitable polyisocyanates and diisocyanates are the isocyanates described below and used as crosslinking agents.

The thixotropic agent containing urea groups may be prepared separately or in the presence of the binder used, especially a polyacrylate resin. In the latter case a common procedure is to add the amine component to a solution of the binder, especially the polyacrylate resin, in an organic solvent or in a mixture of organic solvents and then to add the polyisocyanate as rapidly as possible and with very strong stirring. The resulting mixture of thixotropic agent, containing urea groups, and binder may then be used in the coating materials.

The silica may be a modified, pyrogenic, preferably hydrophobic, silica. Hydrophilic and hydrophobic silicas are obtainable commercially, for example, under the trade name Aerosil® and under the product designations 200, R972, R974, R805 and R812 from Degussa AG, Hanau. The silica is used in an amount of from 0.1 to 10% by weight, preferably from 0.2 to 2.5% by weight, most preferably from 0.6 to 2.0% by weight, based on the overall solids content of the coating material.

In the context of the invention, a very wide variety of binders may be used as principal binders. Principal binders is the term used to refer to those binders which have the largest fraction, quantitatively, among any other binders that may be used. Suitable examples include optionally oil-modified alkyd resins and polyepoxides, polyurethanes, polyesters and polyacrylates, optionally containing hydroxyl groups. In the case of binders for aqueous coating materials, the binders contain ionic or nonionic groups which ensure solubility in water or dispersibility in water. In accordance with the invention, polyacrylate resins are of advantage and are therefore used with preference.

In the case of the polyacrylate resins for nonaqueous coating materials, the binder may in particular be a polyacrylate resin which is preparable by polymerizing (a) from 16 to 51% by weight, preferably from 16 to 28% by weight, of a hydroxyl-containing ester of acrylic acid or methacrylic acid or a mixture of such monomers, b) from 32 to 84% by weight, preferably from 32 to 63% by weight, of a non-(a) aliphatic or cycloaliphatic ester of acrylic acid or methacrylic acid having preferably at least 4 carbon atoms in the alcohol residue or a mixture of such monomers, (c) from 0 to 2% by weight, preferably from 0 to 1% by weight, of an ethylenically unsaturated carboxylic acid or a mixture of ethylenically unsaturated carboxylic acids, and (d) from 0 to 30% by weight, preferably from 0 to 20% by weight, of a non-(a), -(b) and -(c) ethylenically unsaturated monomer or a mixture of such monomers to give a polyacrylate resin having an acid number of from 0 to 15, preferably from 0 to 8, a hydroxyl number of from 80 to 140, preferably from 80 to 120, and a number-average molecular weight of from 1500 to 10 000, preferably from 2000 to 5000, the sum of the weight fractions of components (a), (b), (c) and (d) always being 100% by weight.

The preparation of the polyacrylate resins used with preference may take place in accordance with polymerization processes which are common knowledge, in bulk, solution or emulsion. Polymerization processes for preparing polyacrylate resins are common knowledge and are widely described (cf., e.g., Houben-Weyl, Methoden der organischen Chemie, 4th Edition, Volume 14/1, pages 24 to 255 (1961)).

Further examples of suitable (co)polymerization processes for the preparation of the polacrylate resins are described in the patents DE-A-197 09 465, DE-C-197 09 476, DE-A-28 48 906, DE-A-195 24 182, EP-A-0 554 783, WO 95/27742, DE-A-38 41 540 or WO 82/02387.

Taylor reactors are advantageous, especially for copolymerization in bulk, solution or emulsion.

Taylor reactors, which serve to convert substances under the conditions of Taylor flow, are known. They consist substantially of two coaxial concentric cylinders of which the outer is fixed while the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. Besides the angular velocity of the stirrer, the Taylor number is also dependent on the kinematic viscosity v of the fluid in the gap and on the geometric parameters, the external radius of the inner cylinder $r_i$, the internal radius of the outer cylinder $r_o$ and the gap width d, the difference between the two radii, in accordance with the following formula:

$$Ta = \omega_i r_i d v^{-1} (d/r_i)^{1/2} \qquad (I)$$

where $d = r_o - r_i$.

At low angular velocity, the laminar Couette flow, a simple shear flow, develops. If the rotary speed of the inner cylinder is increased further, then, above a critical level, alternately contrarotating (rotating in opposition) vortices occur, with axes along the peripheral direction. These vortices, called Taylor vortices, are rotationally symmetric and have a diameter which is approximately the same size as the gap width. Two adjacent vortices form a vortex pair or vortex cell.

The basis for this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The viscosity force acts counter to the centrifugal force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs.

Mixing within such vortex pairs is very high, whereas axial mixing beyond the pair boundaries is very low. A vortex pair may therefore be regarded as a stirred tank in which there is thorough mixing. Consequently, the flow system behaves like an ideal flow tube in that the vortex pairs pass through the gap with constant residence time, like ideal stirred tanks.

Of advantage in accordance with the invention are Taylor reactors having an external reactor wall located within which there is a concentrically or eccentrically disposed rotor, a reactor floor and a reactor lid, which together define the annular reactor volume, at least one means for metered addition of reactants, and a means for the discharge of product, where the reactor wall and/or the rotor are or is geometrically designed in such a way that the conditions for Taylor flow are met over substantially the entire reactor length in the reactor volume, i.e., in such a way that the annular gap broadens in the direction of flow.

The polyacrylate resins used are preferably prepared by means of the solution polymerization process. In this process, normally, an organic solvent or solvent mixture is introduced initially and heated to boiling. The monomer mixture to be polymerized, along with one or more polymerization initiators, is then added continuously to this organic solvent or solvent mixture. The polymerization takes place at temperatures between 100 and 160° C., preferably between 130 and 150° C. Polymerization initiators used are preferably initiators which form free radicals. The force and amount of initiator are commonly chosen so that the supply of the radicals during the feed phase at the polymerization temperature is very largely constant.

Examples of initiators that can be used include the following: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; azo dinitriles such as azobisisobutyronitrile, or C-C-cleaving initiators such as benzpinacol silyl ethers.

The polymerization conditions (reaction temperature, feed time of the monomer mixture, nature and amount of the organic solvents and polymerization initiators, possible use of molecular weight regulators, such as mercaptans, thioglycolic esters and chlorinated hydrocarbons) are selected such that the polyacrylate resins employed have a number-average molecular weight of from 1500 to 10 000, preferably from 2000 to 5000 (determined by gel permeation chromatography using polystyrene as calibrating substance).

The acid number of the polyacrylate resins used inventively may be adjusted by the skilled worker by using corresponding amounts of component (c). The same applies to the adjustment of the hydroxyl number. It can be controlled by way of the amount of component (a) employed.

As component (a) it is possible in principle to use any hydroxyl-containing ester of acrylic acid or methacrylic acid, or a mixture of such monomers. Examples include the following: hydroxyalkyl esters of acrylic acid, such as hydroxyethyl acrylate, hydroxypropyl acrylate, hydroxybutyl acrylate, especially 4-hydroxybutyl acrylate; hydroxyalkyl esters of methacrylic acid, such as hydroxyethyl methacrylate, hydroxypropyl methacrylate, hydroxybutyl methacrylate, especially 4-hydroxybutyl methacrylate; reaction products of cyclic esters, such as E-caprolactone, and hydroxyalkyl esters of acrylic and/or methacrylic acid, for example.

The composition of component (a) is preferably selected so that in the case of polymerization of component (a) alone a polyacrylate resin having a glass transition temperature of from −50 to +70, preferably from −30 to +50° C. is obtained. The glass transition temperature may be calculated approximately by the skilled worker with the aid of the formula $$1/T_G = \sum_{n=1}^{n=x} w_n / T_{Gn}$$

$T_G$=glass transition temperature of the polymer
x=number of different monomers copolymerized
$W_n$=weight fraction of the nth monomer
$T_{Gn}$=glass transition temperature of the homopolymer of the nth monomer.

As component (b) it is possible in principle to use any non-(a) aliphatic or cycloaliphatic ester of acrylic acid or methacrylic acid having at least 4 carbon atoms in the alcohol residue, or a mixture of such monomers. Examples include the following: aliphatic esters of acrylic and methacrylic acid having from 4 to 20 carbon atoms in the alcohol residue, such as n-butyl, isobutyl, tert-butyl, 2-ethylhexyl, stearyl and lauryl acrylate and methacrylate, and cycloaliphatic esters of acrylic and methacrylic acid, such as cyclohexyl acrylate and cyclohexyl methacrylate, for example. The composition of component (b) is preferably selected so that in the case of polymerization of component (b) alone a polyacrylate resin having a glass transition temperature of from 10 to 100, preferably from 20 to 60° C. is obtained.

As component (c) it is possible in principle to use any ethylenically unsaturated carboxylic acid or a mixture of ethylenically unsaturated carboxylic acids. As component (c) it is preferred to use acrylic acid and/or methacrylic acid.

As component (d) it is possible in principle to use any non-(a), -(b) and -(c) ethylenically unsaturated monomer, or a mixture of such monomers. Examples of monomers which may be used as component (d) include the following: vinylaromatic hydrocarbons, such as styrene, alpha-alkylstyrene and vinyltoluene, amides of acrylic acid and methacrylic acid, such as methacrylamide and acrylamide, nitrites of methacrylic acid and acrylic acid, for example; vinyl ethers and vinyl esters or polysiloxane macromonomers, as described in the patents DE-A-38 07 571, DE-A-37 06 095, EP-B-0 358 153, U.S. Pat. No. 4,754,014, DE-A 44 21 823 or WO 92/22615. As component (d) it is preferred to use vinylaromatic hydrocarbons, especially styrene. The composition of component (d) is preferably selected so that in the case of polymerization of component (d) alone a resin having a glass transition temperature of from 70 to 120, preferably from 80 to 100° C. is obtained.

Advantageously, the binders are present in the coating material in an amount of from 10 to 90% by weight, with particular preference from 15 to 80% by weight, and in particular from 20 to 70% by weight, based in each case on the overall solids content of the coating material.

The coating material further comprises at least one crosslinking agent.

Where the coating material is a multicomponent system, polyisocyanates and/or polyepoxides, but especially polyisocyanates, are used as crosslinking agents.

Further examples of suitable polyisocyanates are organic polyisocyanates, especially those known as paint polyisocyanates, having free isocyanate groups attached to aliphatic, cycloaliphatic, araliphatic and/or aromatic moieties. Preference is given to using polyisocyanates having from 2 to 5 isocyanate groups per molecule and having viscosities of from 100 to 10 000, preferably from 100 to 5000, and in particular from 100 to 2000 mPas (at 230° C.). If desired, small amounts of organic solvent may be added to the polyisocyanates, preferably from 1 to 25% by weight, based on straight polyisocyanate, in order thus to improve the ease of incorporation of the isocyanate and, where appropriate, to lower the viscosity of the polyisocyanate to a level within the abovementioned ranges. Examples of suitable solvent additives [lacuna] the polyisocyanates are ethoxyethyl propionate, amyl methyl ketone, and butyl acetate. Moreover, the poly-isocyanates may have been modified to make them hydrophilic or hydrophobic, in a customary and known manner.

Examples of suitable polyisocyanates are described, for example, in "Methoden der organischen Chemie", Houben-Weyl, Volume 14/2, 4th edition, Georg Thieme Verlag, Stuttgart 1963, page 61 to 70, and by W. Siefken, Liebigs Annalen der Chemie, Volume 562, pages 75 to 136. Also suitable, for example, are the isocyanato-containing polyurethane prepolymers which can be prepared by reacting polyols with an excess of polyisocyanates and which are preferably of low viscosity.

Further examples of suitable polyisocyanates are polyisocyanates containing isocyanurate, biuret, allophanate, iminooxadiazinedone, urethane, urea and/or uretdione groups. Polyisocyanates containing urethane groups, for example, are obtained by reacting some of the isocyanate groups with polyols, such as trimethylolpropane and glycerol, for example. It is preferred to use aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate or 1,3-bis(isocyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato methylheptane or 1-isocyanato-2-(3-isocyanatopropyl)-cyclohexane, or mixtures of these polyisocyanates.

Further examples of suitable polyisocyanates are those described above for the preparation of the thixotropic agents.

Examples of suitable polyepoxides are all known aliphatic and/or cycloaliphatic and/or aromatic polyepoxides, based, for example, on bisphenol A or bisphenol F. Examples of further suitable polyepoxides include the polyepoxides obtainable commercially under the designations Epikote® from Shell, Denacol® from Nagase Chemicals Ltd., Japan, such as Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether), for example.

In the case of the one-component systems, crosslinking agents are used which react at relatively high temperatures with the functional groups of the binders in order to build up a three-dimensional network. Of course, such crosslinking agents in minor amounts may be used as well in the multicomponent systems. In the context of the present invention, "minor amount" means a fraction which does not disrupt, let alone prevent entirely, the main crosslinking reaction.

Examples of suitable such crosslinking agents are blocked polyisocyanates. Examples of suitable polyisocyanates are those described above.

Examples of suitable blocking agents are the blocking agents known from the U.S. Pat. No. 4,444,954, such as i) phenols such as phenol, cresol, xylenol, nitrophenol, chlorophenol, ethylphenol, t-butylphenol, hydroxybenzoic acid, esters of this acid or 2,5-di-t-butyl-4-hydroxytoluene;

ii) lactams, such as $\epsilon$-caprolactam, $\delta$-valerolactam, $\gamma$-butyrolactam or $\beta$-propiolactam;

iii) active methylenic compounds, such as diethyl malonate, dimethyl malonate, ethyl acetoacetate, methyl acetoacetate or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monopropyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylene chlorohydrin, ethylene bromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazol, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazol, aniline, naphthylamine, butylamine, dibutylamine or butylphenylamine;

ix) imidazoles such as imidazole or 2-ethylimidazole, x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate, or xvi) substituted pyrazoles, ketoximes, imidazoles or triazoles; and also mixtures of these blocking agents, especially dimethylpyrazole and triazoles, malonates and acetoacetates or dimethylpyrazole and succinimide.

As crosslinking agents it is also possible to use tris (alkoxycarbonylamino)triazines of the general formula

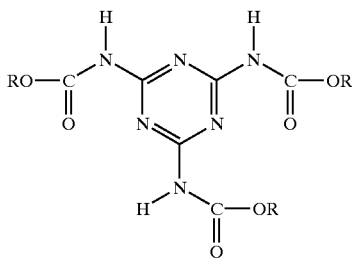

Examples of suitable tris(alkoxycarbonylamino)triazines are described in the patents U.S. Pat. Nos. 4,939,213, 5,084,541 or EP-A-0 624 577. Use is made in particular of the tris(methoxy-, tris(butoxy- and/or tris(2-ethylhexoxycarbonylamino)triazines.

The methyl butyl mixed esters, the butyl 2-ethylhexyl mixed esters, and the butyl esters are of advantage. They have the advantage over the straight methyl ester of better solubility in polymer melts, and also have less of a tendency to crystallize.

In particular it is possible to use amino resins, for example, melamine resins, as crosslinking agents. In this context it is possible to use any amino resin suitable for transparent topcoat materials or clearcoat materials, or a mixture of such amino resins. Particularly suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207.

Further examples of suitable crosslinking agents are beta-hydroxyalkylamides such as N,N,N',N'-tetrakis(2-hydroxyethyl)adipamide or N,N,N',N'-tetrakis(2-hydroxypropyl)adipamide.

Further examples of suitable crosslinking agents are siloxanes, especially siloxanes containing at least one trialkoxy- or dialkoxysilane group.

Further examples of suitable crosslinking agents are polyanhydrides, especially polysuccinic anhydride.

The amount of the crosslinking agents in the coating material may vary widely and is guided in particular firstly by the functionality of the crosslinking agents and secondly by the number of crosslinking functional groups present in the binder, and also by the target crosslinking density. The skilled worker is therefore able to determine the amount of the crosslinking agents on the basis of his or her general knowledge in the art, with or without the assistance of simple rangefinding tests. Advantageously, the crosslinking agent is present in the coating material in an amount of from five to 60% by weight, with particular preference from 10 to 50% by weight, and in particular from 15 to 45% by weight, based in each case on the overall solids content of the coating material. In this context it is advisable, furthermore, to choose the amounts of crosslinking agent and binder such that in the coating material the ratio of functional groups in the crosslinking agent to functional groups in the binder is from 2:1 to 1:2, preferably from 1.5:1 to 1:1.5, with particular preference from 1.2:1 to 1:1.2, and in particular from 1.1:1 to 1:1.1.

The coating material is preferably a nonaqueous coating material, preferably a nonaqueous, transparent gloss clearcoat material. The term gloss clearcoat material indicates that a very high gloss is aimed for, in contrast to the matt coating materials.

Nonaqueous coating materials contain from 20 to 70% by weight, preferably from 40 to 60% by weight (based on the application-ready coating material), of organic solvents, such as aliphatic, aromatic and/or cycloaliphatic hydrocarbons, alkyl esters of acetic acid or propionic acid, alkanols, ketones, glycol ethers and/or glycol ether esters, for example.

The coating material may further comprise at least one customary and known coatings additive in effective amounts, i.e., in amounts of preferably up to 40% by weight, with particular preference up to 30% by weight, and in particular up to 20% by weight, based in each case on the overall solids content of the coating material. It is important that the coatings additives do not adversely affect the transparency and clarity of the coating material.

Examples of suitable coatings additives are

UV absorbers;

light stabilizers such as HALS compounds, benzotriazoles or oxalanilides;

free-radical scavengers;

crosslinking catalysts such as dibutyltin dilaurate or lithium decanoate;

slip additives;

polymerization inhibitors;

defoamers;

emulsifiers, especially nonionic emulsifiers such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphoric esters, polyacrylic acids and their copolymers or polyurethanes;

adhesion promoters such as tricyclodecanedimethanol;

leveling agents;

film forming auxiliaries such as cellulose derivatives;

transparent fillers such as nanoparticles based on silicon dioxide, aluminum oxide or zirconium oxide; for further details, refer to Römpp Lexikon "Lacke und Druckfarben", Georg Thieme Verlag, Stuttgart, 1998, pages 250 to 252;

rheology control additives such as those known from the patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum magnesium silicates, sodium magnesium phyllosilicates and sodium magnesium fluorine lithium phyllosilicates of the montmorillonite type; or synthetic polymers containing ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives, or hydrophobically modified ethoxylated urethanes or polyacrylates;

flame retardants and/or flatting agents.

Further examples of suitable coatings additives (a6) are described in the textbook "Lackadditive" by Johan Bieleman, Wiley-VCH, Weinheim, N.Y., 1998.

The invention additionally provides a process for preparing a coating material of the invention, wherein:

A) a binder is prepared,
B) the urea derivative is prepared in the presence of at least a portion of the binder from stage A), and
C) the mixture of binder and urea derivative is mixed with
   a paste of the silica containing a first portion of a binder which is optionally different than the binder from stage A), preferably a polyacrylate resin of the type described above,
   with a crosslinking agent or a mixture of crosslinking agents and, optionally,
   with at least one of the above-described coatings additives,
   with polyacrylate-compatible binders different than the binders indicated above, and
   if desired, with the remaining portion of the silica pasted with the binder
and adjusted to a customary processing viscosity.

In this case, the crosslinking agent or the mixture of crosslinking agents may be added simultaneously or not until immediately before an application of the coating material. In the case of two-component systems, the crosslinking agent, unblocked polyisocyanates for example, is not added until immediately before the application of the coating material. In the case of one-component systems, the crosslinking agent, blocked polyisocyanates for example, may already have been added by the manufacturer.

The invention further provides for the use of a coating material of the invention for producing a gloss clearcoat finish over a color and/or effect basecoat, especially a basecoat produced using an aqueous basecoat material. Coloring is achieved by means of dyes and/or color pigments. Effect is achieved using effect pigments such as metallic effect pigments or mica pigments.

Examples of suitable aqueous basecoat materials and the corresponding coatings are known from the patents
EP-A-0 089 497, EP-A-0 256 540, EP-A-0 260 447, EP-A-0 297 576, WO 96/12747, EP-A-0 523 610, EP-A-0 228 003, EP-A-0 397 806, EP-A-0 574 417, EP-A-0 531 510, EP-A-0 581 211, EP-A-0 708 788, EP-A-0 593 454, DE-A-43 28 092, EP-A-0 299 148, EP-A-0 394 737, EP-A-0 590 484, EP-A-0 234 362, EP-A-0 234 361, EP-A-0 543 817, WO 95/14721, EP-A-0 521 928, EP-A-0 522 420, EP-A-0 522 419, EP-A-0 649 865, EP-A-0 536 712, EP-A-0 596 460, EP-A-0 596 461, EP-A-0 584 818, EP-A-0 669 356, EP-A-0 634 431, EP-A-0 678 536, EP-A-0 354 261, EP-A-0 424 705, WO 97/49745, WO 97/49747, EP-A-0 401 565, EP-B-0 730 613 or WO 95/14721.

The invention finally provides a process for producing a multicoat color and/or effect paint system on a surface of primed or unprimed substrates, which comprises (1) applying a basecoat material provided with color and/or effect pigments, especially an aqueous basecoat material, to the substrate surface, (2) drying the basecoat film applied in stage (1) at temperatures between 15° C. and 100° C., preferably between 20° C. and 85° C., (3) applying to the basecoat film dried in stage (2) a transparent coating material of the invention as a clearcoat film, and subsequently (4) baking basecoat film and topcoat film together, preferably at temperatures between 120° C. and 180° C. and in a period of from 5 minutes to 60 minutes.

Suitable substrates include all surfaces to be coated of articles which are amenable to curing of the coating films present thereon using heat; examples include articles made of metals, plastics, wood, ceramic, stone, textile, fiber composites, leather, glass, glass fibers, glass wool and rock wool, or mineral- and resin-bound building materials, such as plasterboard and cement slabs or roof tiles. Accordingly, the coating material, especially as a clearcoat material, is highly suitable for applications in automotive finishing, in the coating of furniture and in industrial coating, including coil coating and container coating. In the context of the industrial coatings, it is suitable for coating virtually all parts for private or industrial use, such as radiators, domestic appliances, small metal parts, hubcaps or wheel rims.

With the coating material, especially the clearcoat material, it is also possible in particular to paint primed or unprimed plastics, and also plastics which may have been coated with a basecoat film, such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations according to DIN 7728T1). The plastics to be coated may of course also be polymer blends, modified plastics or fiber reinforced plastics. The coating material may also be used to coat plastics which are commonly used in vehicle construction, especially motor vehicle construction. Nonfunctionalized and/or apolar substrate surfaces may be subjected prior to coating in a known manner to a pretreatment, such as with a plasma or by flaming.

In the multicoat systems produced with the aid of the coating material, especially the clearcoat material, no delamination owing to deficient intercoat adhesion is observed. Their leveling and their optical properties are outstanding. Additionally, they no longer tend toward blushing after condensation exposure.

PREPARATION EXAMPLES

1. The Preparation of a Polyacrylate (A) Which Can Be Used Inventively 897 g of a fraction of aromatic hydrocarbons having a had reached 140° C., a monomer mixture of 487 g of t-butyl acrylate, 215 g of n-butyl methacrylate, 143 g of styrene, 572 g of hydroxypropyl methacrylate and 14 g of acrylic acid was metered into the reactor at a uniform rate over the course of 4 hours, and an initiator solution of 86 g of t-butyl perethylhexanoate in 86 g of the above-described aromatic solvent was metered into the reactor at a uniform rate over the course of 4.5 hours. The metering of the monomer mixture and of the initiator solution was commenced simultaneously. After the end of the metering of initiator, the reaction mixture was held at 140° C. for two more hours and then cooled. The resultant polymer solution, diluted with a mixture of 1-methoxypropyl 2-acetate, butyl glycol acetate and butyl acetate, had a solids content of 53%, determined in a forced air oven at 130° C. for 1 h, an acid number of 10 and a viscosity of 23 dPas (measured on a 60% dilution of the polymer solution in the above-described aromatic solvent using an ICI cone and plate viscometer at 230° C.).

2. The Preparation of a Polyacrylate (B) Which Can Be Used Inventively 720 g of a fraction of aromatic hydrocarbons having a boiling range of 158–1720° C. were weighed into a laboratory reactor having a useful volume of 4 l, equipped with a stirrer, two dropping funnels for the monomer mixture and initiator solution, respectively, a nitrogen inlet pipe, a thermometer and a reflux condenser. The solvent was heated to 140° C. After it had reached 140° C., a monomer mixture of 537 g of 2-ethylhexyl methacrylate, 180 g of n-butyl methacrylate, 210 g of styrene, 543 g of hydroxyethyl acrylate and 30 g of acrylic acid was metered into the reactor at a uniform rate over the course of 4 hours, and an initiator solution of 150 g of t-butyl perethylhexanoate in 90 g of the above-described aromatic solvent was metered into the reactor at a uniform rate over the course of 4.5 hours. The metering of the monomer mixture and of the initiator solution was commenced simultaneously. After the end of the metering of initiator, the reaction mixture was held at 140° C. for two more hours and then cooled. The resultant polymer solution had a solids content of 65%, determined in a forced air oven at 130° C. for 1 h, an acid number of 17 and a viscosity of 16 dPas (measured on a 60% dilution of the polymer solution in the above-described aromatic solvent using an ICI cone and plate viscometer at 23° C.).

3. The Preparation of a Polyacrylate (C) Which Can Be Used Inventively 720 g of a fraction of aromatic hydrocarbons having a boiling range of 158–172° C. were weighed into a laboratory reactor having a useful volume of 4 l, equipped with a stirrer, two dropping funnels for the monomer mixture and initiator solution, respectively, a nitrogen inlet pipe, a thermometer and a reflux condenser. The solvent was heated to 140° C. After it had reached 140° C., a monomer mixture of 450 g of 2-ethylhexyl methacrylate, 180 g of n-butyl methacrylate, 210 g of styrene, 180 g of hydroxyethyl acrylate, 450 g of 4-hydroxybutyl acrylate and 30 g of acrylic acid was metered into the reactor at a uniform rate over the course of 4 hours, and an initiator solution of 150 g of t-butyl perethylhexanoate in 90 g of the above-described aromatic solvent was metered into the reactor at a uniform rate over the course of 4.5 hours. The metering of the monomer mixture and of the initiator solution was commenced simultaneously. After the end of the metering of initiator, the reaction mixture was held at 140° C. for two more hours and then cooled. The resultant polymer solution had a solids content of 65%, determined in a forced air oven at 130° C. for 1 h, an acid number of 15 and a viscosity of 3 dPas (measured on a 60% dilution of the polymer solution in the above-described aromatic solvent using an ICI cone and plate viscometer at 23° C.).

4. The Preparation of a Blocked Polyisocyanate (A) Which Can Be Used Inventively 40 parts by weight of Basonat® HI 190 B/S (hexamethylene diisocyanate-based isocyanurate from BASF Aktiengesellschaft) and 16.4 parts by weight of solvent naphtha were weighed into a 4 l stainless steel reactor and heated to 50° C. 26.27 parts by weight of diethyl malonate, 6.5 parts by weight of ethyl acetoacetate and 0.3 part by weight of catalyst solution (sodium ethylhexanoate) were metered in at a uniform rate over the course of four hours. Subsequently, the temperature was raised to 70° C. When an isocyanate equivalent weight of from 5900 to 6800 had been reached, 1.03 parts by weight of 1,4-cyclohexyldimethanol were added with stirring at 70° C. over 30 minutes. When an isocyanate equivalent weight of ≧13 000 had been reached, 5 parts by weight of n-butanol were added. The temperature was lowered to 50° C. and the resultant blocked polyisocyanate was diluted with n-butanol to a theoretical solids content of 68% by weight.

5. The Preparation of a Blocked Polyisocyanate (B) Which Can Be Used Inventively 41.76 parts by weight of Vestanat® 1890 (isophorone diisocyanate-based isocyanurate from Creanova) and 20.76 parts by weight of solvent naphtha were weighed into a 4 l stainless steel reactor and heated to 50° C. 23.49 parts by weight of diethyl malonate, 5.81 parts by weight of ethyl acetoacetate and 0.14 part by weight of catalyst solution (sodium ethylhexanoate) were metered in at a uniform rate over the course of four hours. After the end of the feed, a further 0.14 part by weight of catalyst solution was added. Subsequently, the temperature was raised to 80° C. When an isocyanate equivalent weight of from 5900 to 6800 had been reached, 0.9 part by weight of 1,4-cyclohexyldimethanol was added with stirring at 80° C. over 30 minutes. When an isocyanate equivalent weight of ≧13 000 had been reached, 5 parts by weight of n-butanol were added. The temperature was lowered to 50° C. and the resultant blocked polyisocyanate was diluted with n-butanol to a theoretical solids content of 63% by weight.

6. The Preparation of a Thixotroping Paste (A) Which Can Be Used Inventively 800 g of millbase consisting of 592 g of the polyacrylate A, 80 g of butyl acetate, 64 g of xylene and 64 g of Aerosil® 972 (Degussa AG, Hanau) together with 1100 g of quartz sand (grain size 0.7–1 mm) were weighed into a stirred laboratory mill from Vollrath and dispersed with water cooling for 30 minutes.

7. The Preparation of a Thixotroping Paste (B) Which Can Be Used Inventively 800 g of millbase consisting of 323.2 g of the polyacrylate C, 187.2 g of butanol, 200.8 g of xylene and 88.8 g of Aerosil® 812 (Degussa AG, Hanau) together with 1100 g of quartz sand (grain size 0.7–1 mm) were weighed into a stirred laboratory mill from Vollrath and dispersed with water cooling for 30 minutes.

8. The Preparation of an Inventive 2K Clearcoat Material (example 1) and of a Noninventive 2K Clearcoat Material (Comparative Experiment 1)

An inventive 2K clearcoat material (example 1) and a conventional 2K clearcoat material (comparative experiment 1) were prepared from the constituents listed in table 1 by mixing and were applied to test panels. The test panels used were bodywork steel panels which had been pretreated with commercially customary zinc phosphate solution and coated as described below with an electrodeposition coating material and a primer-surfacer.

TABLE 1

Composition of the inventive 2K clearcoat material (example 1) and of the conventional 2K clearcoat material (comparative experiment 1)

| Constituents Stock varnish | Example 1 (parts by weight) | Comparative Exp.1 (parts by weight) |
|---|---|---|
| Binder | | |
| Polyacrylate A | 61.9 | 65.4 |

TABLE 1-continued

Composition of the inventive 2K clearcoat material (example 1) and of the conventional 2K clearcoat material (comparative experiment 1)

| Constituents Stock varnish | Example 1 (parts by weight) | Comparative Exp.1 (parts by weight) |
|---|---|---|
| Setalux ® C91756 (Akzo Nobel Resins, Bergen op Zoom) | 13.5 | 13.5 |
| Thixotroping paste A | 5.0 | — |
| Further ingredients | | |
| Substituted hydroxyphenyl-triazine (65% in xylene) | 1.5 | 1.5 |
| N-Methyl-2,2,6,6-tetramethylpiperidyl ester | 1.0 | 1.0 |
| Byk ® 306 (Byk Chemie) | 0.2 | 0.2 |
| Byk ® 310 (Byk Chemie) | 0.15 | 0.15 |
| Byk ® ES 80 (Byk Chemie) | 0.2 | 0.2 |
| Butanol | 1.5 | 1.5 |
| Xylene | 2.45 | 2.7 |
| Ethoxypropyl acetate | 2.0 | 2.0 |
| Butyl glycol acetate | 5.6 | 6.85 |
| Butyl glycolate | 5.0 | 5.0 |
| | 100 | 100 |
| Crosslinker | 33 | 33 |

The crosslinker is a dilution of a polyisocyanate based on hexamethylene diisocyanate (80% dilution of Desmodur® N 3390 from Bayer AG in butyl acetate/solvent naphtha).

Setalux® C91756 is a urea derivative dissolved or dispersed in a binder.

9. Performance Tests

To produce the test panels, an electrodeposition coating material was applied with a film thickness of 18–22 µm and subsequently a water-based primer-surfacer was applied with a film thickness of 35–40 µm, and baking was carried out. The electrodeposition coating material was baked at 170° C. for 20 minutes and the primer-surfacer was baked at 160° C. for 20 minutes. Thereafter, a blue aqueous basecoat material was applied with a film thickness of 12–15 µm and was flashed off at 80° C. for 10 minutes. Finally, the test 2K system of example 1 and of the comparative experiment 1 was applied vertically electrostatically with a film thickness of 40–45 µm in a single application (bell type: Ecobell), after which the basecoat material and the 2K system were cured vertically at 140° C. for 20 minutes (wet-on-wet technique).

TABLE 2

Leveling properties (vertical) of the inventive 2K clearcoat material of example 1 and of the conventional 2K clearcoat material of comparative experiment 1

| | Example 1 | Comparative Exp.1 |
|---|---|---|
| Leveling (visual) | smooth surface (pronounced grain) | more wavy surface (flat grain) |
| Leveling (measured) Wavescan/longwave (40 µm)[a] | 5.0 | 9.0 |

[a] Measuring instrument: Byk/Gardner-Wave scan plus

10. The Preparation of an Inventive 1K Clearcoat Material (example 2) and of a Noninventive 1K Clearcoat Material (Comparative Experiment 2)

An inventive 1K clearcoat material (example 2) and a conventional 1K clearcoat material (comparative experiment 2) were prepared from the constituents listed in table 3 by mixing and were applied to test panels (cf. preparation example 9).

TABLE 3

Composition of the inventive 1K clearcoat material (example 2) and of the conventional 1K clearcoat material (comparative experiment 2)

| Constituents | Example 2 (parts by weight) | Comparative Exp.2 (parts by weight) |
|---|---|---|
| Binder | | |
| Polyacrylate B | 36.8 | 38.7 |
| Setalux ® C91756 (Akzo Nobel Resins, Bergen op Zoom) | 13.1 | 13.1 |
| Thixotroping paste B | 4.8 | — |
| Crosslinking agents | | |
| Polyisocyanate A | 7.5 | 7.5 |
| Polyisocyanate B | 16.4 | 16.4 |
| Commercial butanol-etherified melamine-formaldehyde resin (60% in butanol/xylene) | 12.1 | 12.1 |
| Further ingredients | | |
| Substituted hydroxyphenyl-benzotriazole (95% in xylene) | 1.0 | 1.0 |
| Amino ether-modified 2,2,6,6-tetramethylpiperidyl ester | 0.8 | 0.8 |
| Byk ® 390 (Byk Chemie) | 0.3 | 0.3 |
| Byk ® 310 (Byk Chemie) (5% in xylene) | 0.7 | 0.7 |
| Petroleum spirit 180/210 | 1.6 | 1.6 |
| Solvesso ® 150 | 3.0 | 3.7 |
| Isotridecyl alcohol | 1.5 | 1.5 |
| Xylene | 0.4 | 1.6 |
| | 100 | 100 |

11. Performance Tests

To produce the test panels, an electrodeposition coating material was applied with a film thickness of 18–22 µm and subsequently a water-based primer-surfacer was applied with a film thickness of 35–40 µm, and baking was carried out. The electrodeposition coating material was baked at 170° C. for 20 minutes and the primer-surfacer was baked at 160° C. for 20 minutes. Thereafter, a green aqueous basecoat material was applied with a film thickness of 12–15 µm and was flashed off at 80° C. for 10 minutes. Finally, the test 1K system of example 2 and of the comparative experiment 2 was applied with a film thickness of 40–45 µm, after which the basecoat material and the 1K system were cured at 140° C. for 20 minutes (wet-on-wet technique).

TABLE 4

Constant condensation climate (CCC) test[a] of the inventive 1K clearcoat material of example 2 and of the conventional 1K clearcoat material of comparative experiment 2

|  | Example 2 | Comparative Exp.2 |
| --- | --- | --- |
| Condensation assessment | no blushing due to water inclusion | severe blushing due to water inclusion |

[a]customary technique for evaluating the stability of coating materials to long-term humidity exposure (240 hours, 100% rel. humidity, 40° C.; details in test specification MKK0001A, issue A/14.05.1996, available from BASF Coatings AG). Evaluation is made one hour after the end of condensation exposure.
The results of examples 1 and 2 underscore first the superiority in vertical leveling and secondly in the condensation resistance as compared with the conventional systems.

What is claimed is:

1. A coating material comprising a binder, a crosslinking agent, and at least one thixotropic agent comprising
   a mixture of silicas, and
   at least one urea derivative comprising the reaction product of an isocyanato-containing compound with at least one amine selected from the group consisting of benzylamine, ethylamine, n-propylamine, isopropylamine, n-butylamine, isobutylamine, tert-butylamine, pentylamine, n-hexylamine, n-decylamine, stearylamine, and mixtures thereof.

2. The coating material of claim 1, wherein the silica is a pyrogenic silica.

3. The coating material of claim 1, wherein the binder comprises a polyacrylate resin which is the polymerization product of
   (a) from 16 to 51% by weight of a hydroxyl-containing ester of acrylic acid or methacrylic acid or a mixture thereof,
   (b) from 32 to 84% by weight of a non-(a) aliphatic or cycloaliphatic ester of acrylic acid or methacrylic acid or a mixture thereof,
   (c) from 0 to 2% by weight of an ethylenically unsaturated carboxylic acid or a mixture of ethylenically unsaturated carboxylic acids, and
   (d) from 0 to 30% by weight of a non-(a), -(b) and -(c) ethylenically unsaturated monomer or a mixture thereof,
   wherein the resulting polyacrylate resin has an acid number of from 0 to 15, a hydroxyl number of from 80 to 140, and a number-average molecular weight of from 1500 to 10,000, the sum of the weight fractions of (a), (b), (c) and (d) always being 100% by weight.

4. The coating material of claim 1, wherein the crosslinking agent comprises at least one one member selected from the group consisting of polyisocyanate, polyepoxide, blocked polyisocyanate, tris(alkoxycarbonylamino)triazine, amino resin, beta-hydroxyalkylamino, siloxane, polyanhydride and mixtures thereof.

5. The coating material of claim 1, which is a nonaqueous coating material.

6. A process for preparing a coating material comprising
   A) preparing a binder,
   B. preparing a urea derivative in the presence of at least a portion of the binder from A) to form a mixture of binder and urea derivative, and
   C) mixing the mixture of binder and urea derivative with a paste of a silica and a binder, wherein the urea derivative comprises the reaction product of an isocyanato-containing compound with at least one amine selected from the group consisting of benzylamine, ethylamine, n-propylamine, isopropylamine, n-butylamine, isobutylamine, tert-butylamine, pentylamine, n-hexylamine, n-decylamine, stearylamine, and mixtures thereof.

7. A process for producing a gloss clearcoat finish over a basecoat finish comprising applying the coating material of claim 1 over a basecoat finish.

8. A process for producing a multicoat color and/or effect paint system on a substrate surface, which comprises
   (1) applying a basecoat material comprising color and/or effect pigments to a substrate surface to provide a basecoat film,
   (2) drying the basecoat film at temperatures between 15° C. and 100° C. to provide a dried basecoat film,
   (3) applying to the dried basecoat film a coating material as claimed in claim 1 which is transparent so as to provide a clearcoat film, and subsequently
   (4) baking the dried basecoat film and the clearcoat film together.

9. The coating material of claim 2, wherein the silica is hydrophobic.

10. The coating material of claim 3, wherein the binder comprises the polyacrylate resin which is the polymerization product of
    (a) from 16 to 28% by weight of a hydroxyl-containing ester of acrylic acid or methacrylic acid or a mixture thereof,
    (b) from 32 to 63% by weight of a non-(a) aliphatic or cycloaliphatic ester of acrylic acid or methacrylic acid having at least 4 carbon atoms in the alcohol residue or a mixture thereof,
    (c) from 0 to 1% by weight of an ethylenically unsaturated carboxylic acid or a mixture of ethylenically unsaturated carboxylic acids, and
    (d) from 0 to 20% by weight of a non-(a), -(b) and -(c) ethylenically unsaturated monomer or a mixture thereof,
    wherein the resulting polyacrylate resin has an acid number of from 0 to 8, a hydroxyl number of from 80 to 120, and a number-average molecular weight of from 2000 to 5000, the sum of the weight fractions of (a), (b), (c) and (d) always being 100% by weight.

11. The coating material of claim 5, which is a nonaqueous, transparent gloss clearcoat.

12. The process of claim 6 wherein the binder mixed with the silica is a polyacrylate resin.

13. The process of claim 12 wherein the binder mixed with the silica is a polyacrylate resin which is different than the binder from A).

14. The process of claim 6 wherein mixing the mixture of binder and urea derivative with a paste of a silica and a binder, further comprises mixing in one or more materials selected from the group consisting of one or more crosslinking agents, one or more coatings additives, polyacrylate-compatible binders, and mixtures thereof.

15. The process of claim 6 further comprising adjusting the coating material to a processing viscosity.

16. A coating material comprising a binder, a crosslinking agent, and at least one thixotropic agent comprising
    a mixture of silicas, and
    at least one urea derivative comprising the reaction product of an isocyanato-containing compound with at least one amine selected from the group consisting of primary amine, a secondary amine, and mixtures thereof, wherein the isocyanato-containing compound is selected from the group consisting of those isocyanato-containing compounds having at least two free isocyanates attached to aliphatic moieties, cycloaliphatic moieties, araliphatic moieties, aromatic moieties, and mixtures thereof.

17. The coating material of claim 16, wherein the isocyanato-containing compound is selected from the group consisting of tetramethylene 1,4-diisocyanate, hexamethylene 1,6-diisocyanate, cyclohexyl 1,4diisocyanate, dicyclohexylmethane 4,4'-diisocyanate, 1,5-dimethyl-2,4-di(isocyanatomethyl)benzene, 1,3,5-trimethyl-2,4-di(isocyanatomethyl)benzene 1,3,5-triethyl-2,4-di(isocyanatomethyl)benzene, the trimer of hexamethylene 1,6-diisocyanate, isophorone diIsocyanate, dicyclohexyldimethylmethane 4,4'-diisocyanate, 2,4-tolylene diisocyanate, 2,6-tolylene diisocyanate, diphenylmethane 4,4'-diisocyanate, and mixtures thereof.

\* \* \* \* \*